US010793007B2

(12) United States Patent
Ulrich et al.

(10) Patent No.: US 10,793,007 B2
(45) Date of Patent: Oct. 6, 2020

(54) CURRENT TRANSPORT MECHANISM, IN PARTICULAR AN ELECTRICAL OR ELECTROMECHANICAL CURRENT BAR

(71) Applicant: TE Connectivity Germany GmbH, Bensheim (DE)

(72) Inventors: Harald Ulrich, Fischbachtal (DE); Christian Schmidt, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 111 days.

(21) Appl. No.: 15/848,898

(22) Filed: Dec. 20, 2017

(65) Prior Publication Data

US 2018/0170189 A1   Jun. 21, 2018

(30) Foreign Application Priority Data

Dec. 20, 2016 (DE) .................. 10 2016 124 963

(51) Int. Cl.
*H01R 3/00* (2006.01)
*B60L 5/38* (2006.01)
*B60R 16/02* (2006.01)
*B60L 5/42* (2006.01)
*H01R 25/16* (2006.01)
*H01R 4/04* (2006.01)

(52) U.S. Cl.
CPC ........ *B60L 5/38* (2013.01); *B60L 5/42* (2013.01); *B60R 16/0215* (2013.01); *H01R 3/00* (2013.01); *H01R 4/04* (2013.01); *H01R 25/161* (2013.01); *H01R 2201/26* (2013.01)

(58) Field of Classification Search
CPC .......... H01R 25/161; H01R 4/04; H01R 4/24
See application file for complete search history.

(56) References Cited

U.S. PATENT DOCUMENTS

| 4,959,019 | A | * | 9/1990 | Shimochi | ................ | B60R 16/02 439/115 |
| 5,759,050 | A | * | 6/1998 | Matsuoka | ............ | H01R 9/2425 439/76.2 |
| 5,920,034 | A | * | 7/1999 | Saka | .................... | H01R 9/2466 174/59 |
| 6,466,705 | B2 | * | 10/2002 | Tanaka | ................... | G02F 1/125 359/285 |
| 6,476,705 | B1 | * | 11/2002 | Betti | ...................... | B60R 16/02 337/161 |

(Continued)

FOREIGN PATENT DOCUMENTS

| DE | 3023341 A1 | 1/1982 |
| DE | 19622895 A1 | 12/1996 |
| DE | 60105912 T2 | 3/2006 |

(Continued)

OTHER PUBLICATIONS

German Office Action, dated Oct. 6, 2017, 12 pages.

*Primary Examiner* — Xuong M Chung Trans
(74) *Attorney, Agent, or Firm* — Barley Snyder

(57) ABSTRACT

A current transport mechanism with an elongated, electromechanical base conductor that has an electrically rigidly mechanical plug-in connection device connected thereto in an electrically-rigidly mechanical manner and which, in turn, can be electrically contacted by an electrically-rigidly mechanical mating plug-in connection device.

16 Claims, 5 Drawing Sheets

(56) References Cited

U.S. PATENT DOCUMENTS

2001/0036766 A1* 11/2001 Katoh .................... H01R 25/16
439/395
2008/0038942 A1 2/2008 Gordon et al.

FOREIGN PATENT DOCUMENTS

DE 102014004432 A1 10/2014
DE 202015104023 U1 12/2016
GB 2471382 A 12/2010

* cited by examiner

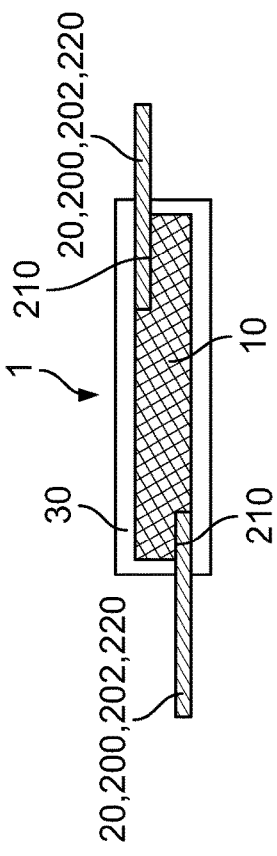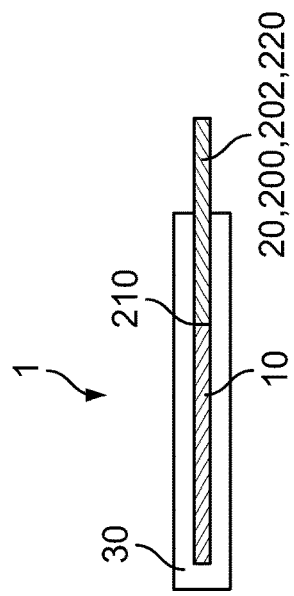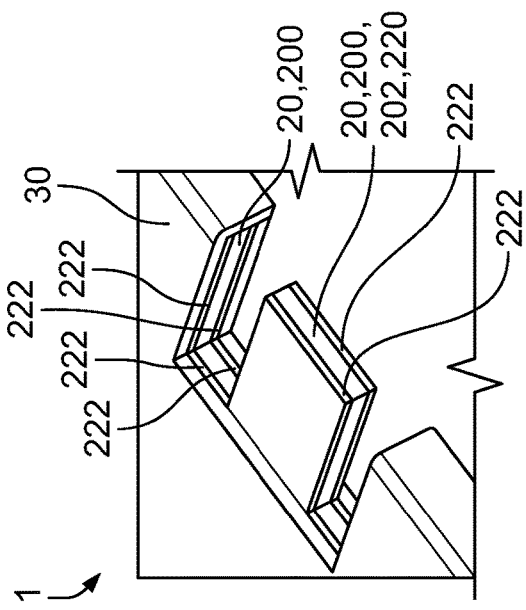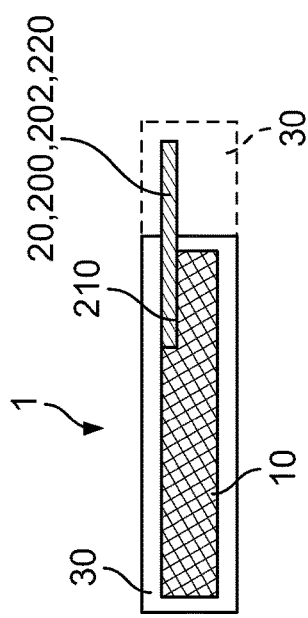

CURRENT TRANSPORT MECHANISM, IN PARTICULAR AN ELECTRICAL OR ELECTROMECHANICAL CURRENT BAR

CROSS-REFERENCE TO RELATED APPLICATION

This application claims the benefit of the filing date under 35 U.S.C. § 119(a)-(d) of German Patent Application No. 102016124963.7 filed Dec. 20, 2016.

FIELD OF THE INVENTION

The present invention relates, in general, to a current transport mechanism and, in particular, to a current transport mechanism for a motor vehicle.

BACKGROUND

In the electrical field (electrical engineering, electronics, electrical power engineering, etc.), a great number of electrical connection mechanisms are known, which serve to transmit electrical currents, voltages, and/or signals at a wide range of currents, voltages, and/or frequencies. In the low-voltage, medium-voltage, or high-voltage range and/or in the low-current, medium-current, or high-current range, connection mechanisms of this kind have to ensure transmission of current, voltage, and/or signals in warm, possibly hot, contaminated, humid, and/or chemically aggressive environments permanently, repeatedly, and/or after a comparatively long service life, possibly at short notice.

By virtue of a wide range of applications, a great number of specially configured connection mechanisms are known. Cable harnesses with flexible or three-dimensionally deflectable electrical conductors made of copper are used today for transporting currents, in particular centrally transporting currents in a vehicle, preferably a motor vehicle. In a comparison with other materials which are suited for electrical conductors, copper has the disadvantage of a comparatively high weight and a comparatively high purchase price for a particular amount of copper. The price disadvantage and weight disadvantage for copper also applies if a copper part is intended to be electrically adequately substituted with a non-copper part. Furthermore, only undirected tensile forces can be mechanically transmitted onto flexible conductors, which makes their structure and assembly laborious as such a structure and/or assembly cannot usually be carried out in an automated manner.

Among the concerns with respect to current transport mechanism for a motor vehicle is that the lower manufacturing costs and/or assembly costs of the current transport mechanism compare favorably to an electrically adequate cable harness made of copper. Furthermore, more than just undirected tensile forces are intended to be able to be transmitted by means of the current transport mechanism in order to facilitate an assembly of the current transport mechanism or to be able to optionally carry out an assembly in an automated manner.

SUMMARY

A current transport mechanism, constructed in accordance with the present invention, includes an elongated electromechanical base conductor and an electrically-rigidly mechanical plug-in connection device connected electrically-rigidly to the elongated, electromechanical base conductor and which can be electrically contacted with a mating plug-in connection device.

BRIEF DESCRIPTION OF THE DRAWINGS

In the figures, which are merely exemplary:

FIG. 6 is a sectioned lateral view of a first exemplary embodiment of an inventive current transport mechanism with a base conductor and a terminal conductor provided thereon, wherein the base conductor and the terminal conductor are formed with the same thickness;

FIG. 7 is a sectioned lateral view of a second exemplary embodiment of the current transport mechanism, wherein the base conductor is formed thicker than the terminal conductor;

FIG. 8 is a sectioned lateral view of a third exemplary embodiment of the current transport mechanism with a base conductor and two terminal conductors provided thereon, wherein the base conductor is formed thicker than the terminal conductors;

FIG. 9 is a perspective view, broken away on two sides, of a fourth exemplary embodiment of the current transport mechanism, wherein a plug-in connection device which is exposed out of a predetermined contact region is depicted;

DETAILED DESCRIPTION OF THE EMBODIMENT(S)

Figure 1:
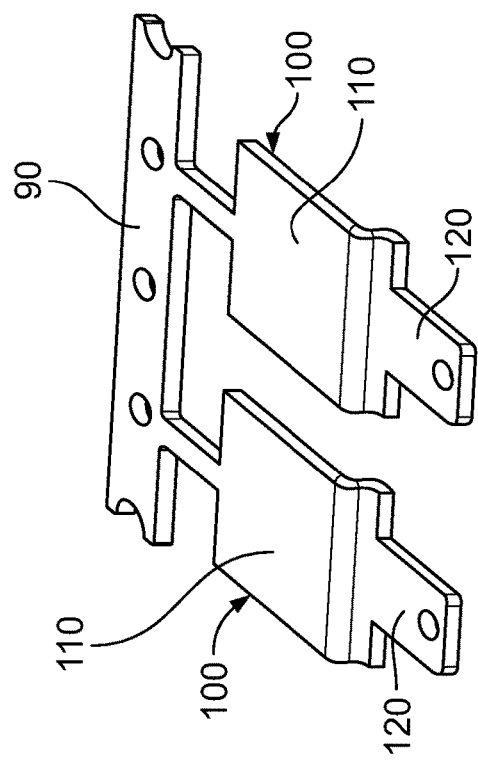
FIG. 1 is a perspective view, broken away on one side, of an electrically insulated base conductor, the electrical insulation of which is removed in the region of a plug-in connection device which can be provided on the base conductor.
Figure 2:
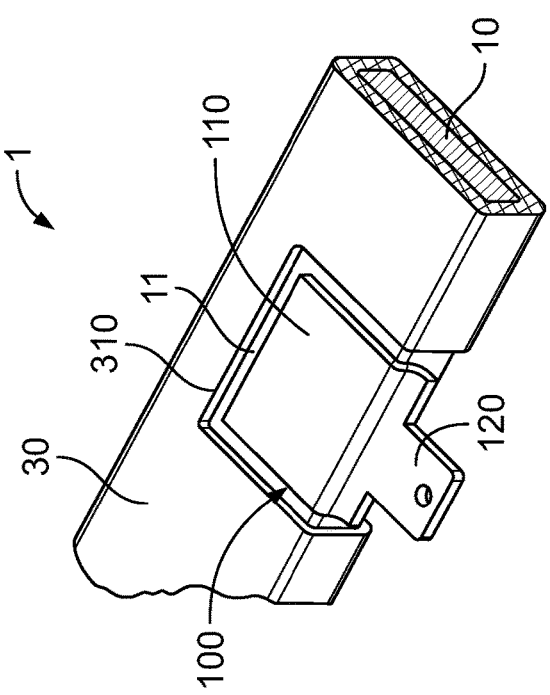
FIG. 2 is a perspective view, broken away on two sides, of a carrier strip with two electrical plug-in connection devices, provided integrally thereon, for the base conductor.
Figure 3:
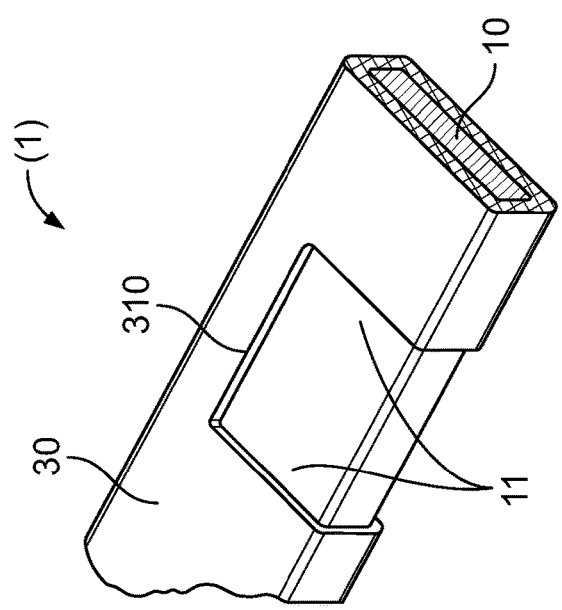
FIG. 3 is a perspective view of the base conductor which is similar to FIG. 1, wherein a plug-in connection device is fixed on the base conductor in the region which is freed from the insulation current transport mechanism.
Figure 5:
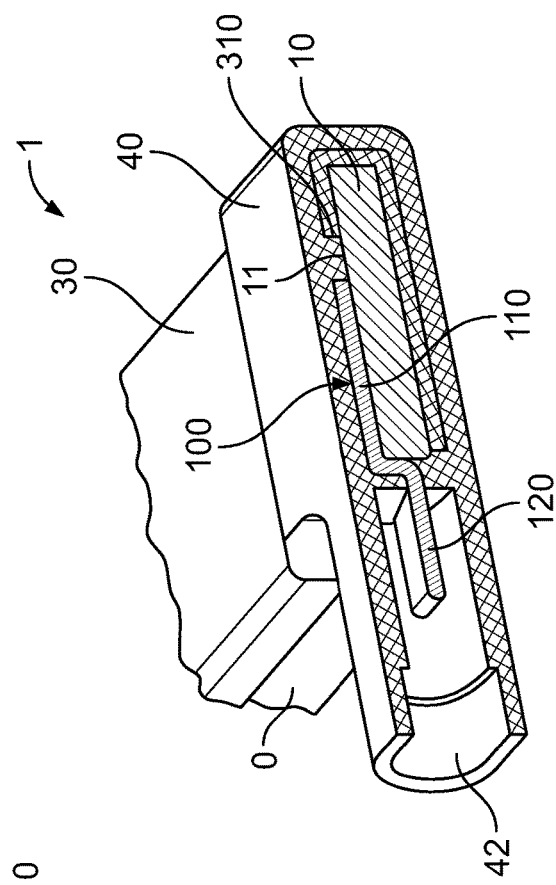
FIG. 5 is a perspective view, broken away on one side, of the current transport mechanism of FIG. 4, wherein the current transport mechanism is depicted as sectioned in a region of its jacketed plug-in connection device.
Figure 4:
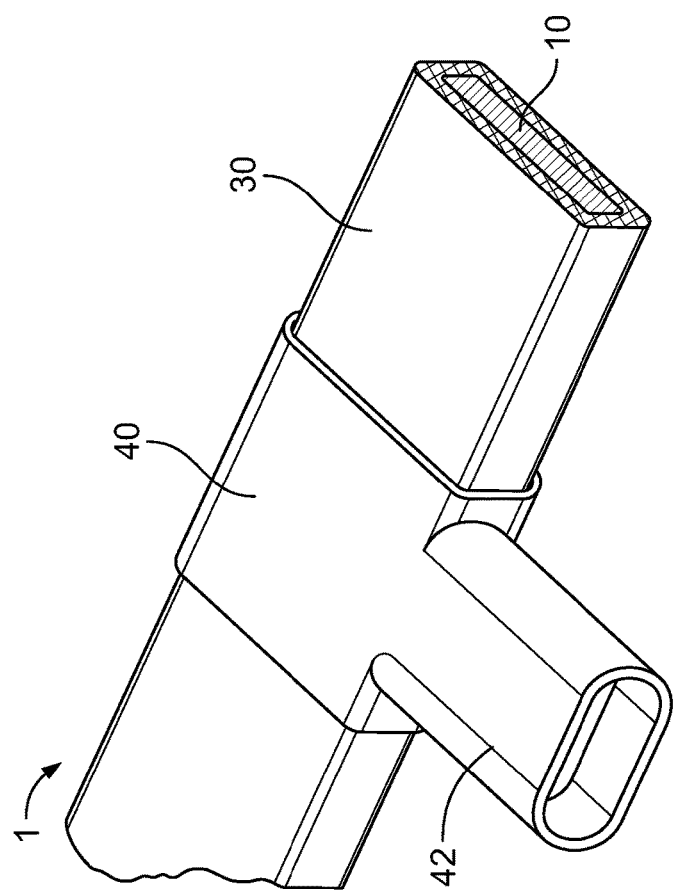
FIG. 4 is a perspective view of the current transport mechanism which is similar to FIG. 3, wherein the current transport mechanism has a jacket in the region of its plug-in connection device.

The present invention is explained in greater detail hereinafter using exemplary embodiments with reference to the attached drawings, which are not true to scale. Sections, elements, structural parts, assemblies, diagrams and/or components which possess an identical, univocal or similar embodiment and/or function are characterized in the description of the figures the list of reference numbers, the claims and in the figures of the drawings with the same reference number. In the invention, a feature (section, element, structural part, assembly, component, function, variable etc.) can be configured to be positive, (i.e., present, or negative, absent, with a negative feature not being explicitly explained as a feature if the fact that it is absent is not deemed to be significant according to the invention. A feature of this specification (description, and claims) and the drawings) can be applied not only in a specified manner but rather can also be applied in a different manner (isolation, summary, replacement, addition, unique, omission, etc.). In particular, using a reference number and a feature attributed to this, or vice versa, in the description, the claims and/or the drawings, it is possible to replace, add or omit a feature in the claims and/or the description. Moreover, a feature in a claim can be interpreted and/or specified in greater detail as a result. The features of this specification can, in view of the largely unknown prior art, also be interpreted as optional features; (i.e., each feature can be understood as an optional, arbitrary or preferred feature, a non-binding feature). It is thus possible to detach a feature, where applicable including its periphery, from an exemplary embodiment, wherein this feature is then transferable to a generalized inventive concept. The lack of a feature (negative feature) in an exemplary embodiment shows that the feature is optional with regard to the invention. Furthermore, in the case of a type term for a feature, a generic term for the feature can also be read alongside this, (where applicable additional hierarchical classification into subgenus, section, etc.) as a result of which it is possible to generalize taking into account identical effect and/or equivalence.

The present invention is explained in greater detail hereinafter using exemplary embodiments of a first variant (FIGS. 1-5) and three exemplary embodiments (FIGS. 6-8 and FIGS. 9, 10, 12, 14-16 and FIGS. 5 11, 13) of a second variant of an inventive current transport mechanism 1. The present invention is useful with vehicles. However, the invention is not limited to such variants, embodiments, and/or the exemplary embodiments which are explained hereinafter, but is of a more fundamental nature, such that it can be applied to other current transport mechanisms in accordance with the invention, (e.g., for an vehicle, an appliance, a machine, a conveying means, a system, a unit, etc., (e.g., for a nonautomotive industry). Only the sections which are necessary for understanding the invention are depicted in the drawings. Although the present invention is more closely described and illustrated in detail by preferred exemplary embodiments, the invention is not restricted by the disclosed exemplary embodiments. Other variations can be derived without departing from the scope of protection of the invention.

A manufacture and a structure of the embodiment of the first variant of the invention is explained in greater detail hereinafter using FIGS. 1-5. In this case, an elongated or rod-shaped electrical or electrically-rigidly mechanical base conductor 10, such as an actual current bar 10, preferably made of aluminum or an aluminum alloy, is provided. Of course, another material can be used. According to the invention, the base conductor can be formed as an electrically-rigidly mechanical base conductor.

The base conductor 10 has an electrical insulation 30, which preferably completely surrounds it in the circumferential direction and which, in particular, is made of a preferably molded-in plastic. In this case, in contrast to the depiction, the two end faces of the base conductor 10 can also have the electrical insulation 30. In the latter case, the base conductor 10 is initially completely encapsulated or electrically insulated. For the current transport mechanism 1, a region is initially localized on the electrical insulation 30 of the base conductor 10, in which region an initially separate, electrical or electrically-rigidly mechanical plug-in connection device 100 (FIG. 2) is intended to be fixedly provided or assembled on the base conductor 10 as shown in FIG. 1. The preferably integral one-piece or one-part plug-in connection device 100 is preferably formed as a (faston) tab contact device 100 or a pin contact device. A bushing contact device can, of course, also be used. In this case, the plug-in connection device 100 is preferably manufactured from aluminum or copper or an aluminum alloy or a copper alloy, in particular stamped or stamped and bent. The plug-in connection device 100 has a contact section 110 for assembling the plug-in connection device 100 on the base conductor 10 and a plug-in contact section 120, by means of which the plug-in connection device 100 can be electrically contacted by an electrical or electrically-rigidly mechanical mating plug-in connection device 9 (cf. FIGS. 12, 13, 16).

The electromechanical base conductor 10 is formed mechanically stiffly or rigidly at least in sections and in all of its sections or across its entire extension substantially in at least two spatial dimensions. A certain mobility can be provided in the vertical direction of its cross-section, because the base conductor, as a notional elongated flat cuboid, is at its smallest here. This means that not only undirected tensile forces can be transmitted in a dimension, as with a flexible electrical conductor, but directed tensile forces in at least two spatial dimensions and pressure forces can also be transmitted in at least two spatial dimensions. This also applies for a terminal conductor of an elongated, electromechanical conductor, which has the base conductor and, formed thereon, the terminal conductor. The term 'rigidly mechanical' in 'electrically-rigidly mechanical' is intended to mean that the plug-in connection device itself, a connection between the plug-in connection device and the base conductor (in contrast to a hinge), and the mating plug-in connection device are formed mechanically stiffly or rigidly. This means that mechanical forces and/or torques can be transmitted between these in preferably three spatial dimensions.

This of course also relates to the (electromechanical or electrically-rigidly mechanical) base conductor itself (in contrast to a flexible or three-dimensionally deflectable electrical conductor), however in a limited sense, which depends on its length, which enables a certain flexibility in a spatial dimension (where applicable, in sections). In this way, for example, a mechanical torque can be introduced on an electrically-rigidly mechanical mating plug-in connection device which is plugged onto an electrically-rigidly mechanical plug-in connection device: from the mating plug-in connection device into the plug-in connection device, from the plug-in connection device over the electrically-rigidly mechanical connection between the plug-in connection device and the electromechanical base conductor, into the base conductor, and from the base conductor further into its suspension (electrical insulation, assembly device, etc.), or vice versa.

The current transport mechanism is formed simply if a connection between the plug-in connection device and the base conductor can no longer be separated without causing damage to or destroying both structural parts. The current transport mechanism is formed integrally if the plug-in connection device and the base conductor are formed substantially homogenous or made in/out of a single original piece. The latter also applies for a monolithic configuration, the plug-in connection device and the base conductor in this case being connected to each other via cohesion forces and the plug-in connection device being formed with the base conductor at least in a polycrystalline manner. In this case, making a differentiation between the plug-in connection device and the base conductor is only possible by the shape. These assertions (materially/adhesively in one piece, simply, integrally or monolithically) also apply for a predetermined contact region or the terminal conductor of a electromechanical conductor which has the base conductor and the terminal conductor formed thereon, the predetermined contact region or the plug-in connection device. The base conductor can be formed substantially solidly and/or have an electrical insulation surrounding it in the circumferential direction. The plug-in connection device can have a mechanical contact section, by means of which the plug-in connection device is fixed on the base conductor. Instead, the plug-in connection device can have a composite contact region, by means of which the plug-in connection device is formed with the base conductor. Furthermore, these plug-in connection devices can each have a plug-in contact section, which can be electrically and mechanically contacted by a mating plug-in connection device. Furthermore, the vehicle current transport mechanism can be formed and/or manufactured like a current transport mechanism.

The electrically-rigidly mechanical connection between the base conductor and the plug-in connection device can be formed monolithically, integrally, simply, materially/adhesively in one piece, in one piece and/or in one part. Formed or connected in one part is intended to mean that the plug-in connection device and the base conductor produce an interconnection, which cannot be mutually moved but which can be easily released by hand or by means of a tool (e.g., by means of deadlock, clipping, screwing, etc.), wherein, for example, a frictional engagement and/or positive engagement can be established between the two structural parts. Moreover, one piece is intended to mean that the plug-in connection device and the base conductor further produce an interconnection, which can no longer be easily released by hand or by means of a tool, which can be the case with crimping, for example (damage to one or both structural parts when releasing the interconnection). A frictional engagement and, where applicable, a positive engagement (preferably) is in this case obligatory. The current transport mechanism is formed materially/adhesively in one piece if the plug-in connection device is connected to the base conductor in a cohesive manner, where applicable to a frictional engagement and/or positive engagement (i.e., they often cannot be separated without damage). This is the case with an adhesion (in this case, a separation without damage may be possible), soldering (in this case, a separation without damage may also be possible), (spot) welding, etc.

The plug-in connection device is exposed out of the electrical insulation and the electromechanical conductor of the current transport mechanism, in particular cut free and/or punched out. In this case, the electrical insulation is removed from the current transport mechanism in a region (optionally part of a predetermined contact region) around the resulting plug-in connection device, and a material of the electromechanical conductor is also removed, depending on a shape and/or size of the resulting plug-in connection device, (i.e., on two sides or on three sides around the resulting plug-in connection device). In this case, at least one slot arises laterally at the plug-in connection device (the plug-in connection device at a longitudinal end), but usually two slots arise (the plug-in connection device at the longitudinal center section) opposite the remaining electromechanical conductor. The plug-in connection device is preferably embedded in the electromechanical conductor. In this case, the plug-in connection device is further provided in a plane of the electromechanical conductor, wherein it is connected on one side to the electromechanical conductor (preferably integrally or monolithically below) and is accessible at the side opposite thereto for the mating plug-in connection device. The current transport mechanism can have at least one predetermined contact region at an outer edge, out of which the plug-in connection device can be exposed. Furthermore, the electromechanical conductor, in particular an electromechanical terminal conductor of the electromechanical conductor, can preferably be coated in the region of the predetermined contact region. In this case, the predetermined contact region can be outwardly marked on/in the electrical insulation of the current transport mechanism, (e.g., by means of a box or the like). An established coating can have, for example, silver, tin, etc., the electromechanical conductor or the electromechanical terminal conductor preferably only being coated in a predetermined contact region.

The plug-in connection device 100 can be completely or selectively coated, (e.g., with silver 222, tin 222, etc.). In the case of a selective coating, only the plug-in contact section 120 is also, where applicable, selectively coated on one side or on two sides. The plug-in connection device 100 is preferably provided by a carrier strip 90, (e.g., on a reel. 30). Temporally, after the localization of the region for the plugin connection device 100, the electrical insulation 30 is substantially completely removed from the base conductor 10 in this region, by, for example, cutting open and extracting the electrical insulation 30. The initial result is an exposed region 11 on the base conductor 10 or of the base conductor 10 under a through-recess 310 or recess 310 in the electrical insulation 30. Temporally thereafter or shortly before the second step, the region 11 of the base conductor 10 is preferably deoxidised.

In the second step, which temporally follows, the plug-in connection device 100 is connected to the base conductor 10 in one part, materially/adhesively in one piece or in one piece (FIG. 3), that is, attached thereon, which, for example, can take place by adhesion, soldering, welding, clinching, etc. For this purpose, the mechanical contact section 110 of the plug-in connection device 100 is fixed on the base conductor 10 in the region 11. The plug-in contact section 120 of the plug-in connection device 100 then protrudes or projects, (e.g., laterally, upwardly or downwardly from the base conductor 10).

Consequently, the inventive current transport mechanism 1 is obtained. Of course, these steps can be performed repeatedly per se if a plurality of plug-in connection devices 100 are intended to be fixedly connected to the base conductor 10.

Temporally, after the plug-in connection device 100 has been fixed to the base conductor 10, a preferably molded-in jacket 40 can be provided over the, where applicable, relevant plug-in connection device 100 (third step). In this case, the jacket 40 can be partially formed as a connector housing 42 for the mating plug-in connection device 9.

A manufacture and a structure of the three embodiments of the second variant of the present invention is explained in greater detail hereinafter using FIGS. 6-16. In this case, an elongated or rod-shaped electrical or electrically-rigidly) mechanical conductor 10/20, such as an actual (current) bar 10/20, preferably made of aluminum and/or copper or an aluminum alloy and/or a copper alloy, is surmised. Of course, another material or other materials or combinations can be used. The electromechanical conductor 10/20 has an electrical insulation 30, which preferably completely surrounds it in the circumferential direction and which, in particular, is made of a preferably molded-in plastic (see FIGS. 9-16). In this case, the two end faces of the conductor 10/20 preferably also have the electrical insulation 30, (i.e., the conductor 10/20 is initially completely encapsulated or electrically insulated).

The electromechanical conductor 10/20 is preferably formed or developed from a metallic composite product or only one single metallic product. In this case, the electromechanical conductor 10/20 can comprise an elongated, electromechanical base conductor 10 and an elongated, electromechanical terminal conductor 20 which is arranged parallel thereto. In a first case, (preferably composite products, FIGS. 6-10, 15 12, 14, 15), the base conductor 10 has a first metallic product, in particular, an aluminum product, and the terminal conductor 20 has a second metallic product, in particular a copper-based product. 20.

The electromechanical conductor of the current transport mechanism can be formed from a metallic composite product, in particular an aluminum/copper composite product. The advantage of copper is that it combines a comparatively high electrical conductivity with comparatively good electromechanical properties (plug-in connection, corrosion resistance, etc.); its high price and its comparatively high density (the heavy weight of an entity made of copper) are disadvantageous. The advantages of aluminum are its comparatively good electrical conductivity, its comparatively low density (the low weight of an entity made of aluminum) and its comparatively low price; its vulnerability to moisture is disadvantageous.

In a second case (FIGS. 11, 13), the base conductor 10 and the terminal conductor 20 have the same metallic product, in particular an aluminum product. In this case, the terminal conductor 20 and the base conductor 10 are preferably formed together, wherein the two of them do not obviously differ from each other, or the base conductor 10 continuously passes into the terminal conductor 20, which is shown in FIG. 11, for example. A differentiation can then be made, firstly irrespective of differences in thickness, shape, etc., on the basis of dimensions. In both cases, the terminal conductor 20 can (as a predetermined contact region 200 or even merely as a plug-in connection device 202, be coated on one side (FIGS. 6, 7, 10, 11) or on both sides (FIGS. 8, 12-16), possibly partially, for at least one potential plug-in connection device 202 which should be set up later, which coating can take place with silver 222, tin 222, etc., for example.

The terminal conductor 20 can be formed, just like the base conductor 10, as an elongated or rod-shaped, electrical or electrically-rigidly) mechanical terminal conductor 20, which is formed monolithically, integrally, simply, materially/adhesively in one piece or in one piece with the base conductor 10. In this case, at the base conductor 10, the terminal conductor 20 can be provided or established in a blank 1 for the current transport mechanism 1, being substantially the same length as the base conductor 10. It is, of course, possible to provide the terminal conductor 20 only in sections at the base conductor 10, such that the terminal conductor 20 can also be formed as at least one predetermined, electrical or electrically-rigidly mechanical contact region 200 or even merely as at least one electrical or electrically-rigidly mechanical plug-in connection device 202. In the blank 1 for the current transport mechanism 1, the electromechanical conductor 10/20 or the base conductor 10 and at least the terminal conductor 20, and thus the at least one predetermined contact region 200 (where applicable of the at least one terminal conductor 20) or the at least one plug-in connection device 202 (where applicable of the at least one predetermined contact region 200 and/or of a terminal conductor 20) are provided with the electrical insulation 30 at least at the only two comparatively large sides (running in the longitudinal direction and in the transverse direction). Preferably, the blank 1 is completely provided with the electrical insulation 30.

For manufacturing a current transport mechanism 1, a position of a plug-in connection device 202 which should be developed in the blank 1 is initially determined at the blank 1 of the current transport mechanism 1 (first step). In this case, at least one position in at least one terminal conductor 20, in at least one predetermined contact region 200, and/or at least one (still electrically insulated) plug-in connection device 202, for the at least one plug-in connection device 202 which should be selected, can be selected. This at least one position can be selected, for example, from a plurality of positions which are marked at/in the electrical insulation 30 (cf. FIG. 9). Temporally thereafter, at least one electrical or electrically-rigidly mechanical plug-in connection device 202 is exposed out of the blank 1 of the resulting current transport mechanism 1, in particular cut free or punched out (second step). In this case, possibly only the electrical insulation 30 is removed from the blank 1 in a relevant region. Furthermore, the plug-in connection device 202 can be formed thereon subsequently or substantially simultaneously. The latter preferably takes place by providing two slots (only one slot is necessary at one longitudinal end) in the longitudinal direction to the right and left of the resulting plug-in connection device 202 (cf. FIG. 9). An electrical or electrically-rigidly mechanical mating plug-in connection device 9 can later be plugged on the resulting (faston) tab contact device 202 or pin contact device 202 of the actual current transport mechanism 1. The configurations of the exemplary embodiments of the current transport mechanisms 1 depicted in FIGS. 6 to 16 are explained in greater detail hereinafter in a cursory manner. In the case of FIG. 6, the base conductor 10 and the terminal conductor 20 or the predetermined contact region 200 are formed substantially with the same thickness, a longitudinal side of the base conductor 10 and a longitudinal side of the terminal conductor 20 being connected to each other in a composite contact region 210. The plug-in connection device 202 was exposed with its plug-in contact section 220 out of the terminal conductor 20 or the predetermined contact region 200, which also applies for FIGS. 7 and 8.

In the case of FIG. 7, the terminal conductor 20 is thinner than the base conductor 10 and is provided at an outer side, having a large surface area, of the base conductor 10, the terminal conductor 20 being embedded with its composite contact region 210 in the base conductor 10 (the terminal conductor 20 preferably partially overlaps the base conductor 10 in the transverse direction). The composite contact region 210 is not only established longitudinally but also transversely between the terminal conductor 20 and the base 10 conductor 10.

Figure 16:
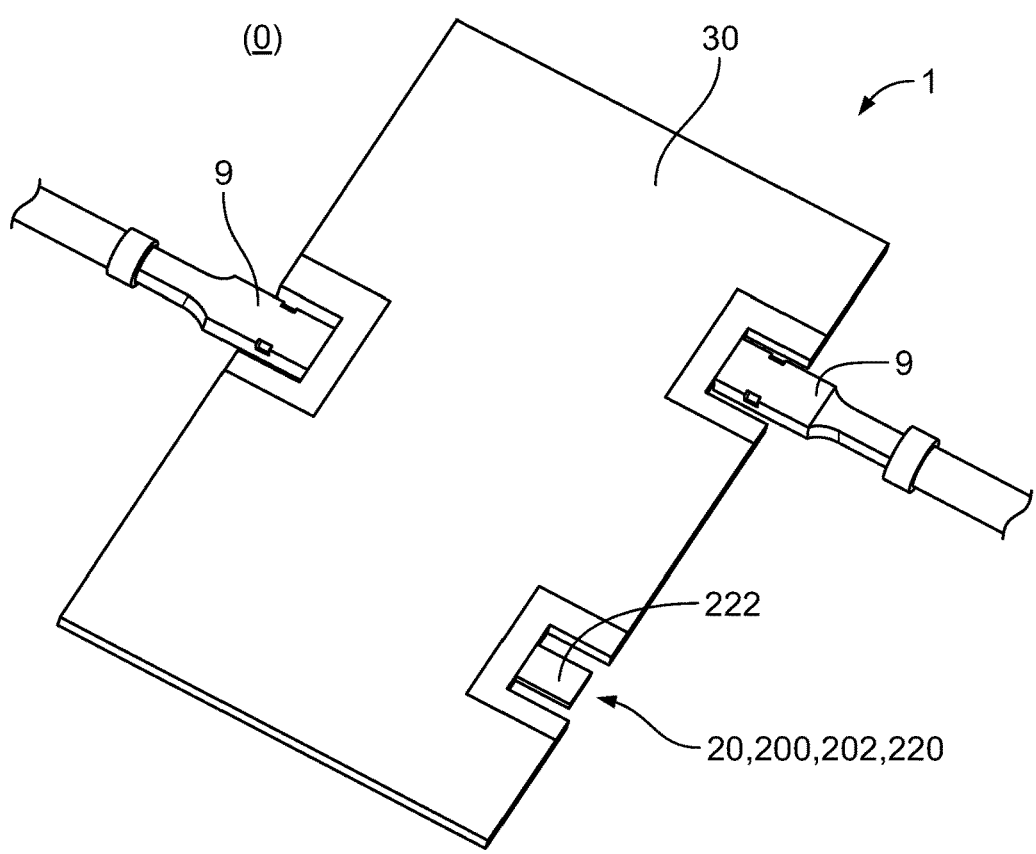
FIG. 16 is a perspective view, broken away on two sides, of an eleventh exemplary embodiment of the current transport mechanism, wherein three plug-in connection devices which are exposed out of predetermined contact regions (boxes) are depicted.

FIG. 8 shows a base conductor 10 with two terminal conductors 20 which are provided thereon and which are similar to FIG. 7, the base conductor 10 being formed thicker than the terminal conductors 20, which are fixed thereon, being located diagonally opposite each other with regard to a cross-section of the base conductor 10. In FIGS. 6-8, the respective plug-in contact section 220 of the relevant plug-in connection device 202 protrudes outwardly from the current transport mechanism 1 and is accessible from five translatory directions, provided there is enough space in both longitudinal directions. The relevant plug-in contact section 220 is not accessible from only one transverse direction. FIGS. 6-8 do not show a coating 222 of the respective plug-in contact sections 220 of the plug-in connection devices 202 or the plug-in connection devices 202. In the exemplary embodiments of FIGS. 6-8, which each show the first embodiment, such an embodiment can, of course, be applied. A transition to the second embodiment is depicted in FIG. 7 using dashes (this can also be applied in FIGS. 6 and 8). In the second embodiment, the stripped plug-in contact section 220 of the relevant plug-in connection device 202 is embedded in the current transport mechanism 1, the plug-in contact section 220 only being accessible from three translator directions (the front, above, underneath). This is also shown in FIG. 9, which moreover shows a coated terminal conductor 20 (coating 222) or a coated, predetermined contact region 200 and a coated plug-in connection device 202 or a coated plug-in contact section 220. FIG. 16 shows three plug-in connection devices 202 or plug-in contact sections 220 of this kind, which are each contacted by a mating plug-in connection device 9.

The following FIGS. 10-15 show cross-sections of current transport mechanisms 1 at a distance in its established plug in connection devices 202 or plug-in contact sections 220; and, as before, fully circumferentially electrically insulated cross-section of the relevant current transport mechanism 1 is depicted in each case. In this case, the respective current transport mechanism 1 can have at least one exposed plug-in connection device 202 or one exposed plug-in contact section 220. This is highlighted in FIGS. 12 and 13 by means of, in each case, a mating plug-in connection device 9, which is plugged onto a plug-in connection device 202 which is not depicted or a plug-in contact section 220 which is not depicted.

Figure 10:
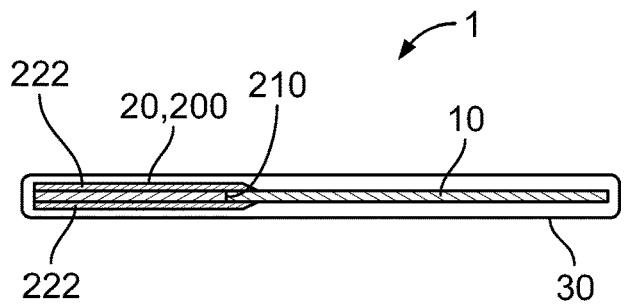
FIG. 10 is a sectioned lateral view of a fifth exemplary embodiment of the current transport mechanism which is similar to FIG. 6, with an aluminum-based base conductor and a predetermined contact region or silver-plated, copper-based terminal conductor.
Figure 11:
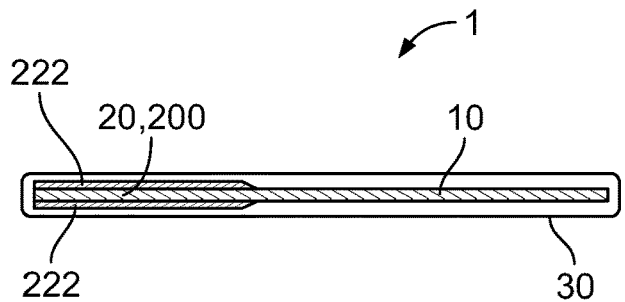
FIG. 11 is a sectioned lateral view of a sixth exemplary embodiment of the current transport mechanism which is similar to FIG. 6, with an aluminum-based base conductor and a predetermined contact region or silver-plated, aluminum-based terminal conductor.
Figure 12:
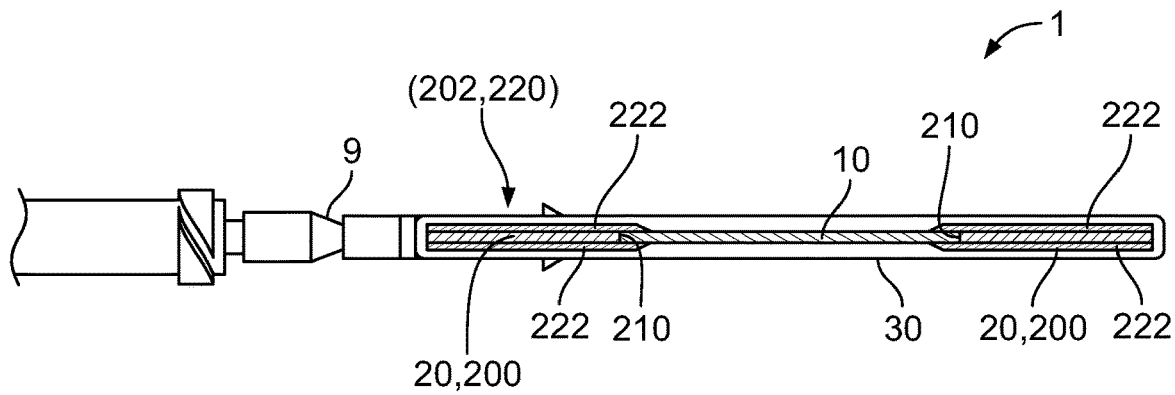
FIG. 12 is a sectioned lateral view of a seventh exemplary embodiment of the current transport mechanism which is similar to FIG. 10, with predetermined contact regions provided on two sides or silver-plated terminal conductors.
Figure 13:
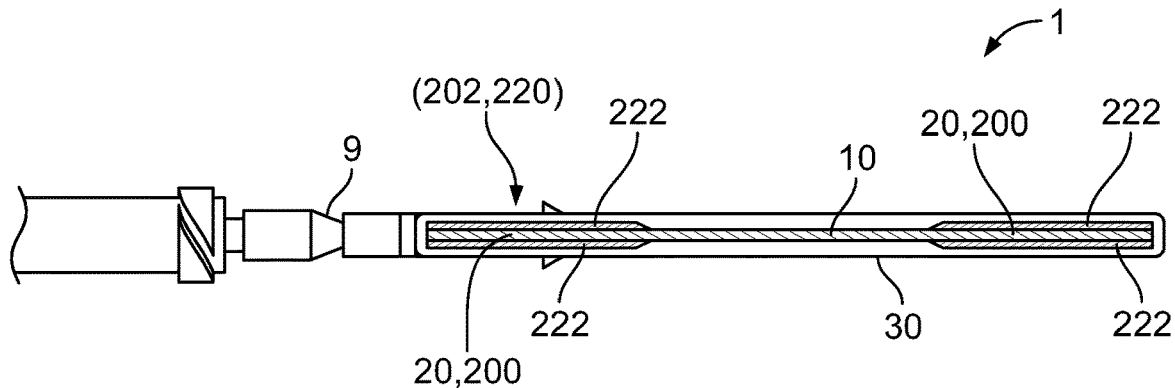
FIG. 13 is a sectioned lateral view of an eighth exemplary embodiment of the current transport mechanism which is similar to FIG. 11, with predetermined contact regions provided on two sides or silver-plated terminal conductors.

FIG. 10 shows an aluminum-based base conductor 10 of a current transport mechanism 1, at which one single copper-based terminal conductor 20 is provided laterally (composite product). In this case, the terminal conductor 20 is coated on both sides, in particular with silver 222. FIG. 11 shows a configuration which is similar to FIG. 10, but wherein the terminal conductor 20 and the base conductor 10 are both aluminum-based. In this case, it is preferable that the terminal conductor 20 is manufactured simultaneously with the base conductor 10 (extrusion, rolling, casting, etc.). The base conductor 10 and the terminal conductor 20 are preferably formed monolithically, integrally and/or simply. FIG. 12 shows a depiction of the current transport mechanism 1 which is similar to FIG. 10, but wherein two double-sided, copper-based terminal conductors 20, which are preferably coated with silver 222, are provided at the transverse sides of the aluminum-based base conductor 10. Furthermore, FIG. 13 shows the current transport mechanism 1 which is similar to FIG. 11, wherein two double-sided, aluminum-based terminal conductors 20, which are preferably coated with silver 222, are formed at the transverse sides of the also aluminum-based base conductor 10. In the exemplary embodiments of FIGS. 10-13, the relevant conductors 10, 20 can be formed with the same thickness. By way of example, FIG. 14 highlights that this does not have to be the case with two terminal conductors 20 at a single base conductor 10, which terminal conductors 20 are of varying thickness and are preferably coated with silver 222. In this case, the relevant terminal conductor 20 is preferably thinner (left in FIG. 14) than the base conductor 10, or preferably has the same thickness (left in FIG. 14) as the base conductor 10.

Figure 14:
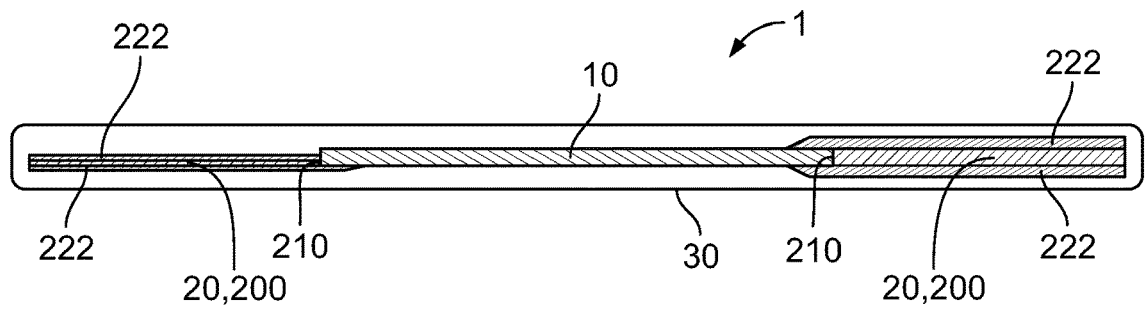
FIG. 14 is a sectioned lateral view of a ninth exemplary embodiment of the current transport mechanism, with predetermined contact regions provided on two sides or silver-plated terminal conductors, which are formed of variable thickness.
Figure 15:
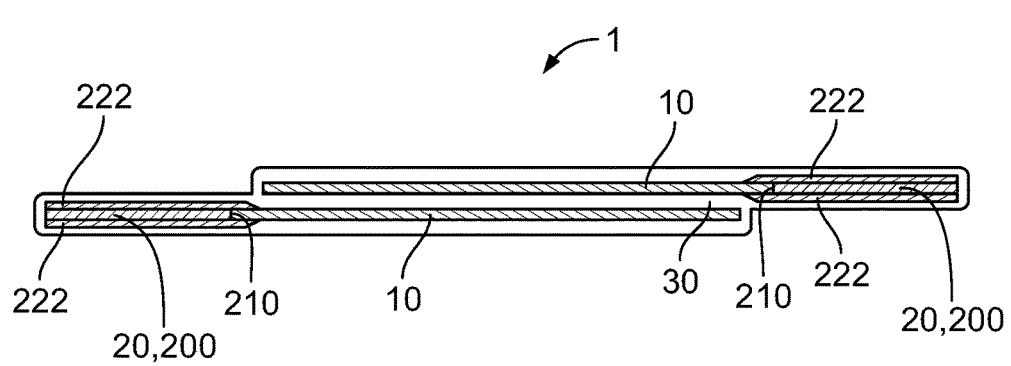
FIG. 15 is a sectioned lateral view of a tenth exemplary embodiment of the current transport mechanism, wherein the current transport mechanism is formed as a bilayer current transport mechanism.

Furthermore, it can be advantageous in all exemplary embodiments that a coating 222 reaches up to the base conductor 10 and where applicable slightly overlaps it (cf. FIGS. 10, 12, 14, 15). FIG. 14 shows a current transport mechanism 1 as a bilayer current transport mechanism 1 with two electromechanical conductors 10/20, 10/20 which are electrically insulated from each other. In this case, preferably only one single layer of an electrical insulation 30 is provided between the two base conductors 10.

Furthermore, it is preferable that a terminal conductor 20 or a predetermined contact region 200 is provided at the relevant base conductor 10 at only one longitudinal side. A different number of electromechanical conductors 10/20, 10/20, is of course possible (a multilayer current transport mechanism 1). A jacket 40, 42 according to the first variant of the invention can of course be applied to all exemplary embodiments.

The current transport mechanism preferably has, as above, an elongated, electromechanical conductor with an electrical insulation surrounding it in the circumferential direction. In a first step, at a blank of the current transport mechanism, a position of a plug-in connection device, which should be formed therein, is determined, and in a second step, which temporally follows the first step, the plug-in connection device is established in the blank of the current transport mechanism, whereby the actual current transport mechanism is obtained. In this case, the plug-in connection device can be formed as a tab contact device or a pin contact device.

In the second step, the plug-in connection device is preferably exposed out of the electrical insulation of the blank and the electromechanical conductor, in particular cut free and/or punched out, which can take place successively or simultaneously. If this takes place successively, the electrical insulation is initially removed down to the electromechanical conductor, hence a through-recess is provided in the electrical insulation. Subsequently, the plug-in connection device is formed in the electromechanical conductor. With the temporal combination of these two substeps, in the second step, the electrical insulation of the electromechanical conductor is completely removed in a region of the plug-in connection device, which hereinafter results in the electromechanical conductor, and furthermore, a material of the electromechanical conductor is removed, depending on a shape and/or size of the resulting plug-in connection device, i.e. on two or three sides around the plug-in connection device. Preferably, the current transport mechanism or the blank of the current transport mechanism has at least one predetermined contact region at the outer edge, out of which the plug-in connection device is exposed. A plug-in contact section of the plug-in connection device protrudes from the electromechanical conductor, but is preferably established (embedded) therein inside a longitudinal side of the current transport mechanism.

What is claimed is:

1. A current transport mechanism comprising:
an elongated, electromechanical base conductor; and
an electrically-rigidly mechanical plug-in connection device connected electrically-rigidly to the elongated, electromechanical base conductor and which can be electrically contacted with a mating plug-in connection device, the electrically-rigidly mechanical plug-in connection device is formed monolithically, integrally, simply, materially/adhesively in one piece and/or in one part with the elongated, electromechanical base conductor.

2. The current transport mechanism according to claim 1, wherein the plug-in connection device has:
(a) a mechanical contact section fixed on the elongated, electromechanical base conductor,
(b) a composite contact region formed with the elongated, electromechanical base conductor,
(c) a plug-in contact section electrically and mechanically contacted by the mating plug-in connection device.

3. A current transport mechanism comprising:
an elongated electromechanical base conductor;
a plug-in connection device; and
an electrical insulation completely circumferentially surrounding the elongated electromechanical base conductor and having a through-recess through which the elongated electromechanical base conductor electrically contacts the plug-in connection device.

4. The current transport mechanism according to claim 3, wherein the plug-in connection device has a mechanical contact section that contacts the elongated electromechanical base conductor in the region of the through-recess of the electrical insulation and protrudes from the base conductor.

5. The current transport mechanism according to claim 4, further including a jacket in a region of the plug-in connection device that seals the plug-in mechanical contact section of the plug-in connection device in a fluid-tight manner.

6. The current transport mechanism according to claim 5, wherein:
(a) the elongated electromechanical base conductor is an electrically-rigidly mechanical base conductor,
(b) the plug-in connection device is a stamped part or a stamped bent part,
(c) the plug-in connection device is a tab contact device or a pin contact device,
(d) the plug in the plug-in the plug-in connection device is connected to the base conductor in one part, materially/adhesively in one piece or in one piece,
(e) the elongated electromechanical base conductor is contacted by the plug-in connection device in an electrically-rigidly mechanical manner in the region of the through-recess,
(f) the elongated electromechanical base conductor is deoxidised in the region of the through-recess, and/or
(g) the jacket is an overmold formed in sections as a connector housing for a mating plug-in connection device.

7. A current transport mechanism comprising:
an elongated electromechanical conductor;
an electrical insulation completely surrounding the elongated electromechanical conductor circumferentially; and
a plug-in connection device exposed out of the electrical insulation and the elongated electromechanical conductor.

8. The current transport mechanism according to claim 7, wherein:
(a) the current transport mechanism has a contact region at an outer edge out of which the plug-in connection device is exposed, and
(b) the elongated electromechanical conductor has an electromechanical terminal conductor coated in the region of the contact region.

9. The current transport mechanism according to claim 8 wherein the elongated electromechanical conductor is formed from at least one of:
(a) a metallic composite product, and
(b) a single metallic product.

10. The current transport mechanism according to claim 7, wherein the elongated electromechanical conductor has:
(a) an elongated, electromechanical base conductor having an aluminum-based metallic product, and
(b) an elongated, electromechanical terminal conductor:
(1) in parallel with electromechanical base conductor,
(2) integrally or monolithically formed with the elongated, electromechanical base conductor, and
(3) having a copper-based metallic product.

11. The current transport mechanism according to claim 7, further including:
(a) an elongated, electromechanical base conductor, and
(b) an elongated, electromechanical terminal conductor extending along a longitudinal section of the elongated, electromechanical base conductor.

12. The current transport mechanism according to claim 10, wherein, with the exception of a coating, a thickness of the plug-in connection device or the terminal conductor is smaller than, the same as or greater than a thickness of the base conductor, and/or the current transport mechanism is formed as a multilayer current transport mechanism with a plurality of electromechanical conductors in particular as a bilayer current transport mechanism with two electromechanical conductors.

13. The current transport mechanism according to claim 10, wherein:
(a) the elongated, electromechanical base conductor is formed as an electrically-rigidly mechanical base conductor,
(b) the elongated, electromechanical terminal conductor is formed as an electrically-rigidly mechanical terminal conductor, and/or
(c) the electrically-rigidly mechanical plug-in connection device is formed as a tab contact device or a pin contact device.

14. The current transport mechanism according to claim 9 wherein the metallic composite product is an aluminum/copper composite product.

15. The current transport mechanism according to claim 7, wherein the elongated electromechanical conductor has:
(a) an elongated, electromechanical base conductor having a first metallic product, and
(b) an elongated, electromechanical terminal conductor:
(1) in parallel with electromechanical base conductor,
(2) having a second metallic product that is the same as the first metallic product, and
(3) is integrally or monolithically formed with the elongated, electromechanical base conductor.

16. The current transport mechanism according to claim 7, further including:
 (a) an elongated, electromechanical base conductor, and
 (b) an elongated, electromechanical terminal conductor at each side of the elongated, electromechanical base conductor and extending along longitudinal sections of the elongated, electromechanical base conductor.

* * * * *

UNITED STATES PATENT AND TRADEMARK OFFICE
CERTIFICATE OF CORRECTION

PATENT NO.        : 10,793,007 B2
APPLICATION NO.   : 15/848898
DATED             : October 6, 2020
INVENTOR(S)       : Harald Ulrich and Christian Schmidt Page 1 of 1

It is certified that error appears in the above-identified patent and that said Letters Patent is hereby corrected as shown below:

In the Claims

In Claim 6, Column 11, Line 54, delete "the plug in the plug-in the" and insert --the-- therefor Signed and Sealed this
Twenty-third Day of November, 2021

Drew Hirshfeld
*Performing the Functions and Duties of the
Under Secretary of Commerce for Intellectual Property and
Director of the United States Patent and Trademark Office*